US012655953B2

(12) United States Patent
Lee

(10) Patent No.: US 12,655,953 B2
(45) Date of Patent: Jun. 16, 2026

(54) AIMING DEVICE FOR ADJUSTING LAMP OF VEHICLE

(71) Applicants: Hyundai Motor Company, Seoul (KR); Kia Corporation, Seoul (KR)

(72) Inventor: Seong Hoon Lee, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/967,168

(22) Filed: Dec. 3, 2024

(65) Prior Publication Data

US 2025/0389402 A1 Dec. 25, 2025

(30) Foreign Application Priority Data

Jun. 25, 2024 (KR) ........................ 10-2024-0082621

(51) Int. Cl.
*F21S 43/19* (2018.01)
*F21S 41/19* (2018.01)

(52) U.S. Cl.
CPC ........... *F21S 41/192* (2018.01); *F21S 43/195* (2018.01)

(58) Field of Classification Search
CPC ...... F21S 41/192; F21S 43/195; F21S 41/657; F21S 41/635; F21S 41/19; F21S 45/00; B60Q 1/0683; B60Q 1/076; B60Q 1/10; B60Q 1/12; B60Q 1/124; B60Q 2300/122; F21W 2107/10; F21W 2102/00; F21W 2102/13; F21V 25/00
See application file for complete search history.

(56) References Cited

U.S. PATENT DOCUMENTS 10,625,659 B2 * 4/2020 Tajima ................. B60Q 1/0683
2003/0133309 A1 7/2003 Seif et al.
2007/0297182 A1 12/2007 Stache
2008/0106909 A1 * 5/2008 Kusagaya ............ B60Q 1/0683 362/523
2008/0225543 A1 9/2008 Kuwahara et al.
2009/0154190 A1 6/2009 Choi et al.

FOREIGN PATENT DOCUMENTS

CN 110939915 A * 3/2020 .............. F21S 41/32
EP 2 298 602 A2 3/2011
JP 2020-050194 A 4/2020
KR 10-1490939 B1 2/2015

OTHER PUBLICATIONS

Search English translation of CN-110939915-A (Year: 2020).*
Extended European Search Report issued Jun. 4, 2025 in corresponding European Patent Application No. 24216731.0.

* cited by examiner

*Primary Examiner* — Omar Rojas Cadima
(74) *Attorney, Agent, or Firm* — Fox Rothschild LLP

(57) ABSTRACT

A lamp for a vehicle includes a lamp housing, an aiming bracket coupled to a light source module and rotatably disposed about a pivot point inside the lamp housing, and a support structure coupled inside the lamp housing and configured to rotatably support the aiming bracket. The aiming bracket includes a pivot component having a contact surface that may be spherical in shape, and the pivot component contacts a support surface of the support structure corresponding to the contact surface and forming the pivot point.

16 Claims, 17 Drawing Sheets

AIMING DEVICE FOR ADJUSTING LAMP OF VEHICLE

CROSS-REFERENCE TO RELATED APPLICATION(S)

This application claims under 35 U.S.C. § 119(a) the benefit of Korean Patent Application No. 10-2024-0082621 filed on Jun. 25, 2024 in the Korean Intellectual Property Office, the entire contents of which are incorporated herein by reference.

BACKGROUND

(a) Technical Field

The present disclosure relates to an aiming device for adjusting a lamp such as a headlamp of a vehicle.

(b) Description of the Related Art

In general, headlamps of a vehicle are installed on both sides of the front of the vehicle to irradiate light forwards so that the driver may easily recognize objects ahead when the vehicle is driving on the road at night.

The headlamps are restricted by relevant laws and regulations in terms of their forward irradiation angle so as not to dazzle the driver of an oncoming vehicle. If the irradiation angle of the headlamp deviates from the relevant laws and regulations, aiming is required to adjust the irradiation direction of the headlamp up and down and left and right. At this time, the headlamp aiming device is a device that changes the irradiation direction by adjusting the irradiation angle of the headlamp.

Aiming may be done by the driver manually operating an aiming screw to adjust the irradiation direction of the light, or the driver may use an actuator or the like to automatically adjust the irradiation direction of the light by operating the aiming screw while riding in the vehicle.

However, existing headlamp aiming devices may not have sufficiently strong vibration resistance, and thus, it would be desirable to provide a structure that is resistant to vehicle vibrations.

SUMMARY

An aspect of the present disclosure is to provide an aiming device for a vehicle having a structure resistant to vehicle vibrations by supporting a load of an aiming bracket to which a lamp module is coupled, from below, and a lamp for the vehicle including the same.

The aspect of the present disclosure is not limited to that mentioned above, and other purposes not mentioned will be clearly understood by those skilled in the art to which the present disclosure belongs from the description below.

In one aspect, a lamp for a vehicle is provided, the lamp comprising: a) a lamp housing; b) an aiming bracket coupled to a light source module and rotatably disposed about a pivot point inside the lamp housing; and c) a support structure coupled inside the lamp housing and configured to rotatably support the aiming bracket, wherein the aiming bracket includes a pivot component, and wherein the pivot component contacts a support surface of the support structure corresponding to the contact surface and forming the pivot point. In certain preferred aspects, the pivot component comprises a spherical contact surface. In certain preferred aspects, the pivot component includes a portion of a virtual sphere centered on the pivot point, and the contact surface corresponds to a portion of a surface of the virtual sphere.

According to an aspect of the present disclosure, a lamp for a vehicle includes a lamp housing; an aiming bracket coupled to a light source module and rotatably disposed about a pivot point inside the lamp housing; and a support structure coupled inside the lamp housing and configured to rotatably support the aiming bracket. The aiming bracket includes a pivot component having a spherical contact surface, and the pivot component contacts a support surface of the support structure corresponding to the contact surface and forming the pivot point.

The pivot component may include a portion of a virtual sphere centered on the pivot point, and the contact surface may correspond to a portion of a surface of the virtual sphere.

The aiming bracket may further include a base plate to which the light source module is coupled, and the pivot component may include a first pivot component having a first contact surface and a second pivot component having a second contact surface.

The first contact surface and the second contact surface may have the same radii of curvature.

The first pivot component may be provided on a lower portion of the base plate.

The second pivot component may be provided on an upper portion of the base plate to face the first pivot component.

The support structure may include a first support member rotatably supporting the first pivot component and a second support member rotatably supporting the second pivot component.

The first support member and the second support member may be coupled to an inner surface of the lamp housing, and the support structure may further include an elastic member disposed between at least one of the first support member and the second support member and the inner surface of the lamp housing.

The first support member and the second support member may respectively include a first support portion and a second support portion coupled to the first support portion, and the support surface may be provided by coupling of the first support portion and the second support portion.

At least one of the first support member and the second support member may be provided with a shape in which the first support portion and the second support portion are symmetrical.

A first vertex of the first contact surface, the pivot point, and a second vertex of the second contact surface may be connected by a virtual first straight line.

The lamp for a vehicle may further include a first aiming unit connected to upper and lower aiming points of the aiming bracket and rotating the aiming bracket in upper and lower directions; and a second aiming unit connected to left and right aiming points of the aiming bracket and rotating the aiming bracket in left and right directions.

The upper and lower aiming points may be located on the virtual first straight line.

The left and right aiming points and the pivot point may be connected by a virtual second straight line, and the virtual second straight line may be perpendicular to the virtual first straight line.

Each of the first aiming unit and the second aiming unit may include a body having an aiming screw and a pivot head, and a retainer into which the pivot head is rotatably inserted, and the retainer may be fixedly coupled to the aiming bracket.

A vehicle may include the above-described lamp.

According to an aspect of the present disclosure, a lamp for a vehicle includes a lamp housing; an aiming bracket provided with a light source module and configured to rotate inside the lamp housing; and a support structure provided inside the lamp housing and configured to rotatably support the aiming bracket. A contact surface of the aiming bracket and the support structure is spherical in shape.

According to an aspect of the present disclosure, an aiming device includes an aiming bracket to which a light source module is coupled, and configured to rotate about a pivot point; a support structure configured to rotatably support the aiming bracket; and an aiming unit coupled to the aiming bracket and rotating the aiming bracket about the pivot point. The aiming bracket includes a pivot component having a contact surface with a spherical shape, and the pivot component contacts a support surface of the support structure corresponding to the contact surface and forming the pivot point.

The pivot component may include a portion of a virtual sphere centered on the pivot point, and the contact surface may correspond to a portion of a surface of the virtual sphere.

The pivot component may include a first pivot component having a first contact surface and a second pivot component having a second contact surface, and the support structure may include a first support member rotatably supporting the first pivot component and a second support member rotatably supporting the second pivot component.

The aiming device may further include a first aiming unit connected to upper and lower aiming points of the aiming bracket and rotating the aiming bracket in upper and lower directions; and a second aiming unit connected to left and right aiming points of the aiming bracket and rotating the aiming bracket in left and right directions.

A first vertex of the first contact surface, the pivot point, the upper and lower aiming points, and a second vertex of the second contact surface may be connected by a virtual first straight line, and the left and right aiming points and the pivot point may be connected by a virtual second straight line, perpendicular to the virtual first straight line.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
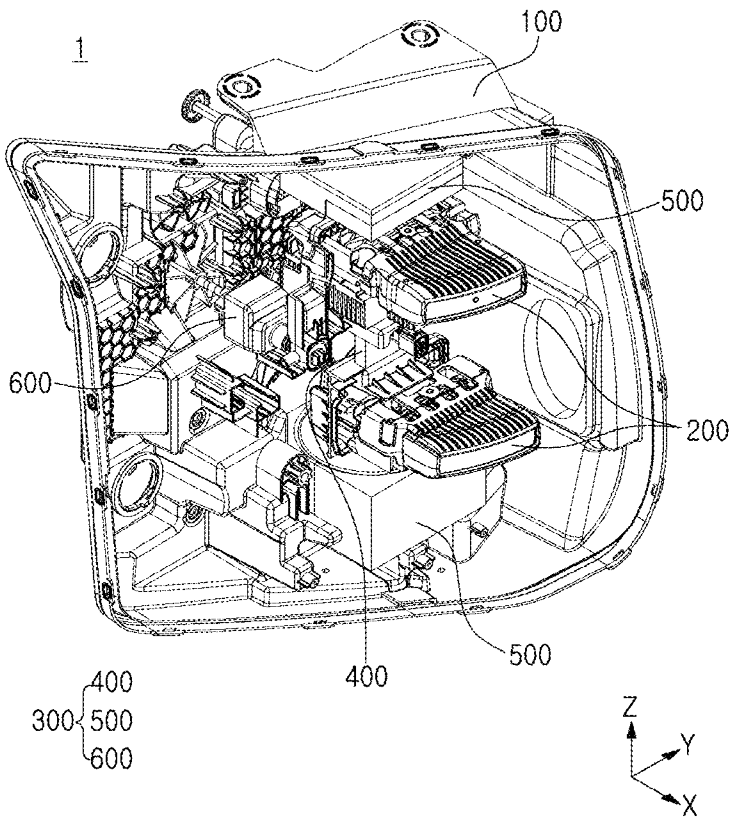
FIG. 1 is a front perspective view of a lamp for a vehicle according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "module", "-er", "-or", and "module" described in the specification mean modules for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMS, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Since the present disclosure may make various changes and have various embodiments, some embodiments are illustrated in the drawings and described in detail. However, this is not intended to limit the present disclosure to the embodiments, and should be understood to include all modifications, equivalents, and substitutes included in the spirit and scope of the present disclosure.

Terms such as first and second may be used to describe various components, but the components should not be limited by the terms. These terms are only used for distinguishing one component from another. For example, a first element may be termed a second element, and similarly, a second element may be termed a first element, without departing from the scope of the present disclosure. The term 'and/or' includes a combination of a plurality of related recited items or any one of a plurality of related recited items.

Terms used in this specification are only used to describe embodiments, and are not intended to limit the present disclosure. Singular expressions include plural expressions unless the context clearly dictates otherwise. In this specification, the terms "include," "have" and the like are intended to designate that there is a feature, number, step, operation, component, part, or combination thereof described in the specification, but it should be understood that it does not preclude the possibility of the presence or addition of one or more other features, numbers, steps, operations, components, parts, or combinations thereof.

Unless defined otherwise, all terms used herein, including technical or scientific terms, have the same meaning as commonly understood by one of ordinary skill in the art to which the present disclosure belongs. Terms such as those defined in commonly used dictionaries should be interpreted as having a meaning consistent with the meaning in the context of the related art, and unless expressly defined in this application, it is not to be construed in an ideal or overly formal sense.

In this specification, a vehicle refers to various vehicles that move a transport object such as a person, an animal, or an object from a starting point to a destination. Such vehicles are not limited to vehicles that run on roads or tracks.

Hereinafter, embodiments will be described with reference to the drawings.

Figure 2:
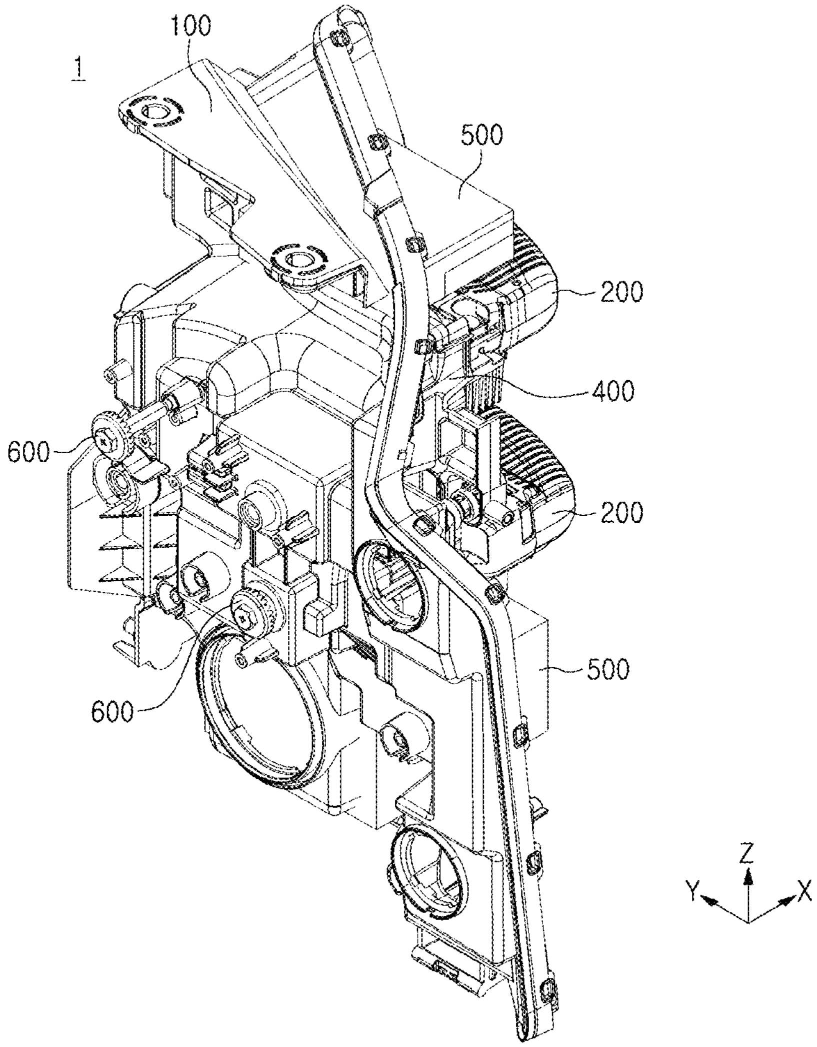
FIG. 2 is a rear perspective view of a lamp for a vehicle according to an embodiment.
Figure 3:
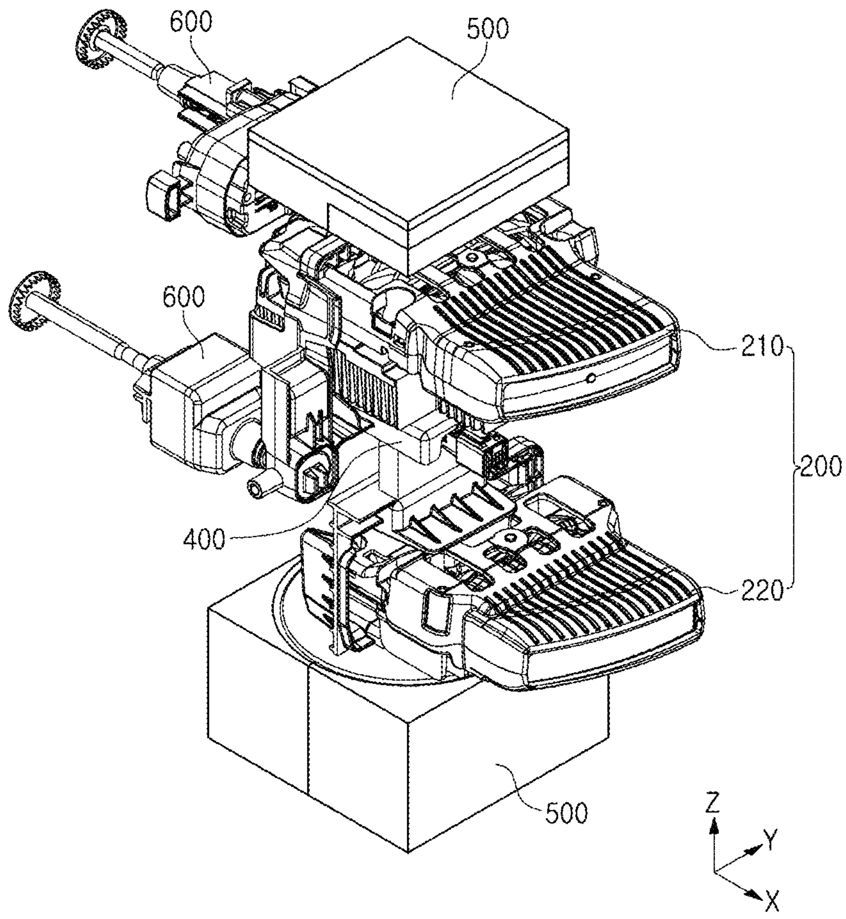
FIG. 3 is a front perspective view of a lamp module and an aiming device of a lamp for a vehicle according to an embodiment.
Figure 4:
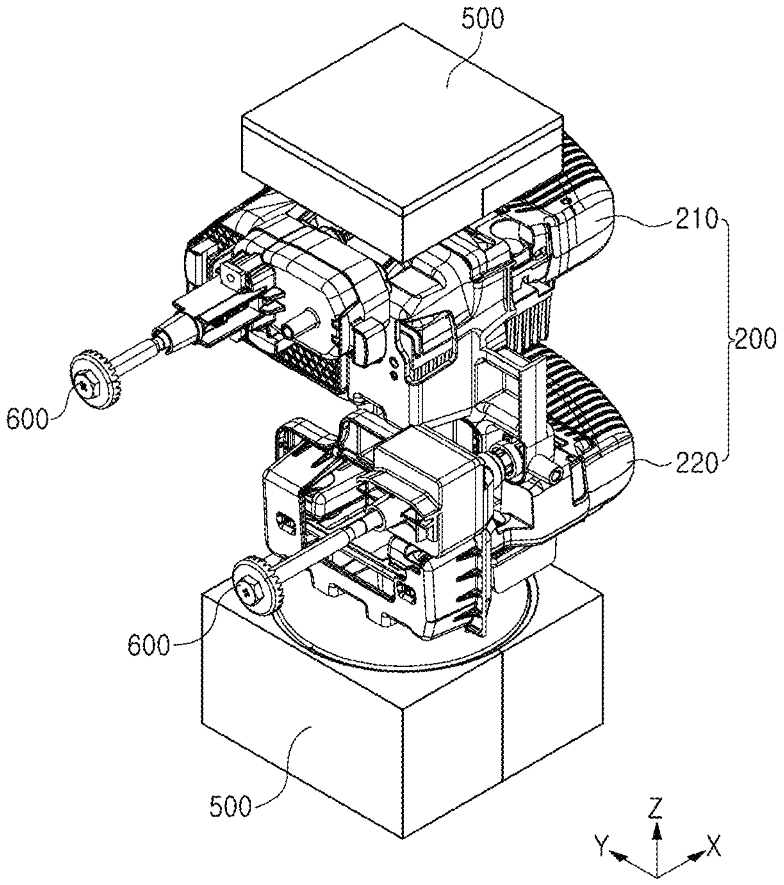
FIG. 4 is a rear perspective view of a lamp module and an aiming device of a lamp for a vehicle according to an embodiment.

FIG. 1 is a front perspective view of a lamp for a vehicle according to an embodiment. FIG. 2 is a rear perspective view of a lamp for a vehicle according to an embodiment. FIG. 3 is a front perspective view of a lamp module and an aiming device of a lamp for a vehicle according to an embodiment. FIG. 4 is a rear perspective view of a lamp module and an aiming device of a lamp for a vehicle according to an embodiment.

FIGS. 3 and 4 may be drawings of a lamp for a vehicle 1 illustrated in FIGS. 1 and 2 with a lamp housing 100 omitted.

The lamp for a vehicle 1 according to an embodiment may be a headlamp that irradiates light in the driving direction of the vehicle when the vehicle is driven at night or in a dark place to secure a forward view. However, the lamp for a vehicle 1 according to an embodiment is not limited to a head lamp, and may include various lamps installed in a vehicle, such as a fog lamp, a tail lamp, a brake lamp, a turn signal lamp, a backup lamp, a daytime running lamp, a position lamp, and the like.

Referring to FIGS. 1 to 4, the lamp for a vehicle 1 according to an embodiment may include a lamp housing 100, a light source module 200, and an aiming device 300.

The lamp housing 100 forms at least a portion of the exterior of the lamp for a vehicle 1, and may have a space provided therein in which the light source module 200 and the aiming device 300 are accommodated. The lamp housing 100 may be a component that is coupled to a vehicle body when the lamp for a vehicle 1 is mounted or assembled to a vehicle. The lamp housing 100 may be formed so that one side is open, and may be configured so that a cover lens (not illustrated) is coupled to the open side.

The lamp housing 100 may support the light source module 200 and the aiming device 300. For example, the aiming device 300 coupled with the light source module 200 may be coupled to and supported by the lamp housing 100. The lamp housing 100 may be coupled to the aiming device 300 in such a manner that most of the aiming device 300 is located inside the lamp housing 100 but a portion (for example, a part operated for aiming) is exposed to the outside of the lamp housing 100. At this time, at least a portion of the aiming device 300 may be rotatably coupled to the lamp housing 100.

The light source module 200 is a configuration that provides or outputs light, and may include various components such as a reflector, a shield, a lens, and the like to form a suitable beam pattern corresponding to the type/use of the lamp for a vehicle 1, including a light source that generates light. For example, the light source module 200 may have various components, optical systems or the like included in the light source module 200, changed depending on the type/use of the lamp for a vehicle 1.

According to various embodiments, the light source module 200 may be referred to by various terms such as a lamp unit, a lamp module, a lamp assembly, a light source unit, or a light source assembly.

The light source module 200 may be coupled to an aiming device 300. The light source module 200 may be coupled to an aiming bracket 400 of the aiming device 300. For example, the light source module 200 may be fixedly coupled to the aiming bracket 400 to move integrally with the aiming bracket 400. For example, the light source module 200 may be provided to adjust the direction or angle of light irradiation, and the like, by aiming in the horizontal direction and/or vertical direction by the movement (for example, rotation or pivot) of the aiming bracket 400.

In this case, the horizontal direction (for example, Y-axis direction) may refer to a direction parallel to the ground when the vehicle equipped with the lamp for a vehicle 1 is on the ground, and the vertical direction (for example, Z-axis direction) may refer to a direction parallel to the ground when the vehicle equipped with the lamp for a vehicle 1 is on the ground.

The light source module 200 may be provided in one or more. According to the illustrated embodiment, the light source module 200 may include a first light source module 210 and a second light source module 220 disposed below the first light source module 210. The first light source module 210 and the second light source module 220 may be disposed side by side in the vertical direction. For example, the first light source module 210 may be placed relatively higher on the aiming bracket 400, and the second light source module 220 may be placed relatively lower on the aiming bracket 400.

However, the illustrated embodiment is an example, and the number of light source modules 200 and the positions of the light source modules 200 are not limited to the illustrated embodiment, and may be variously changed depending on the type/use of the lamp for a vehicle 1.

The aiming device 300 may perform aiming by adjusting the direction/angle in which light is irradiated from the light source module 200 by rotating the light source module 200 in at least one of the horizontal direction (for example, left-right direction) and the vertical direction (for example, up-down direction).

The aiming device 300 may include an aiming bracket 400 to which a light source module 200 is coupled, a support structure 500 coupled to the lamp housing 100 and configured to rotatably support the aiming bracket 400 to form a pivot center of the aiming bracket 400, and an aiming unit 600 coupled to the aiming bracket 400 and provided to implement vertical and horizontal aiming.

The aiming device 300 of a lamp for a vehicle 1 according to an embodiment may have a structure in which aiming is performed while the aiming bracket 400 rotates along a trajectory on a surface of a sphere (for example, a spherical surface) whose center point is located inside the aiming bracket 400. To this end, the aiming bracket 400 may be provided with a spherical body, and the support structure 500 may be provided with a support surface having a sphere corresponding to the spherical body. The components of the aiming device 300 are described in detail below with reference to FIGS. 5 to 9.

Figure 5:
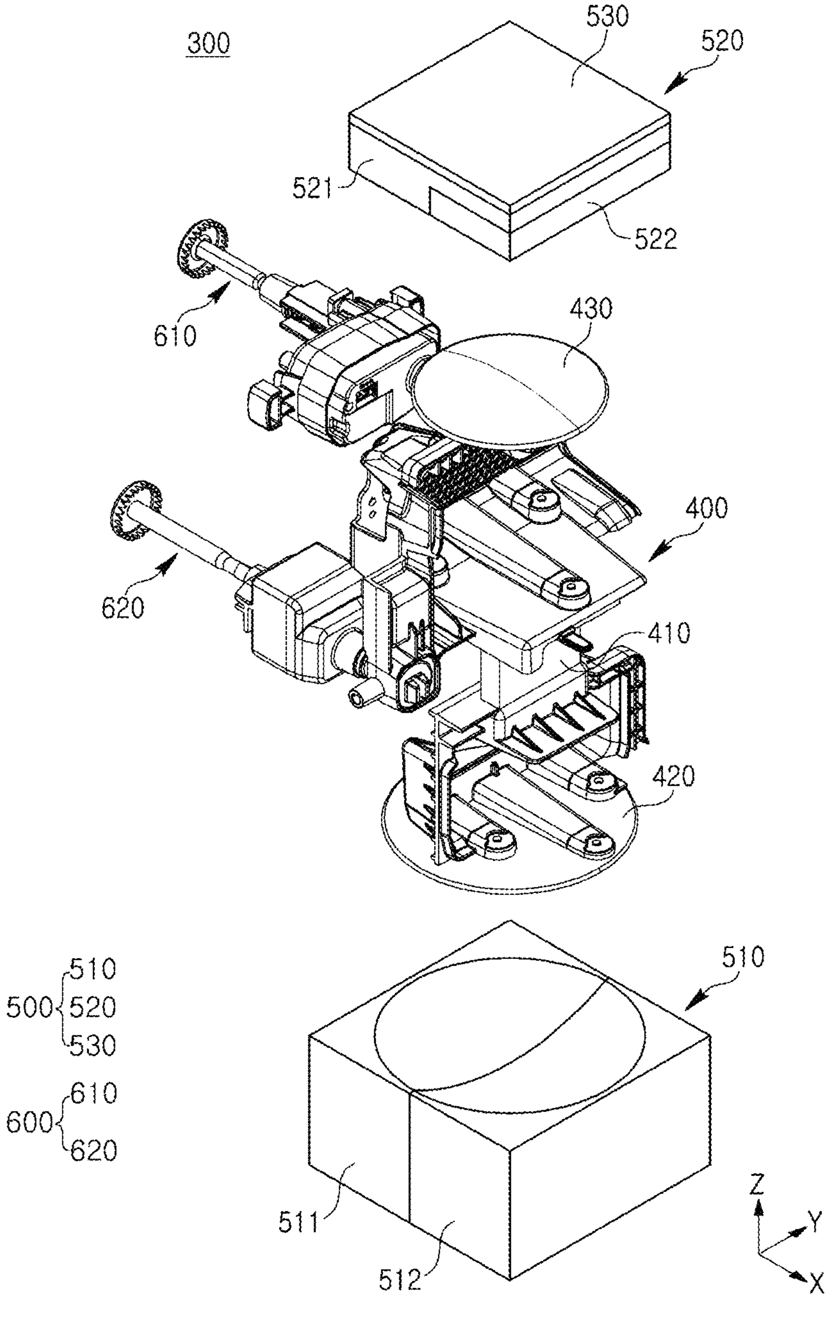
FIG. 5 is a perspective view of an aiming device of a lamp for a vehicle according to an embodiment.
Figure 6:
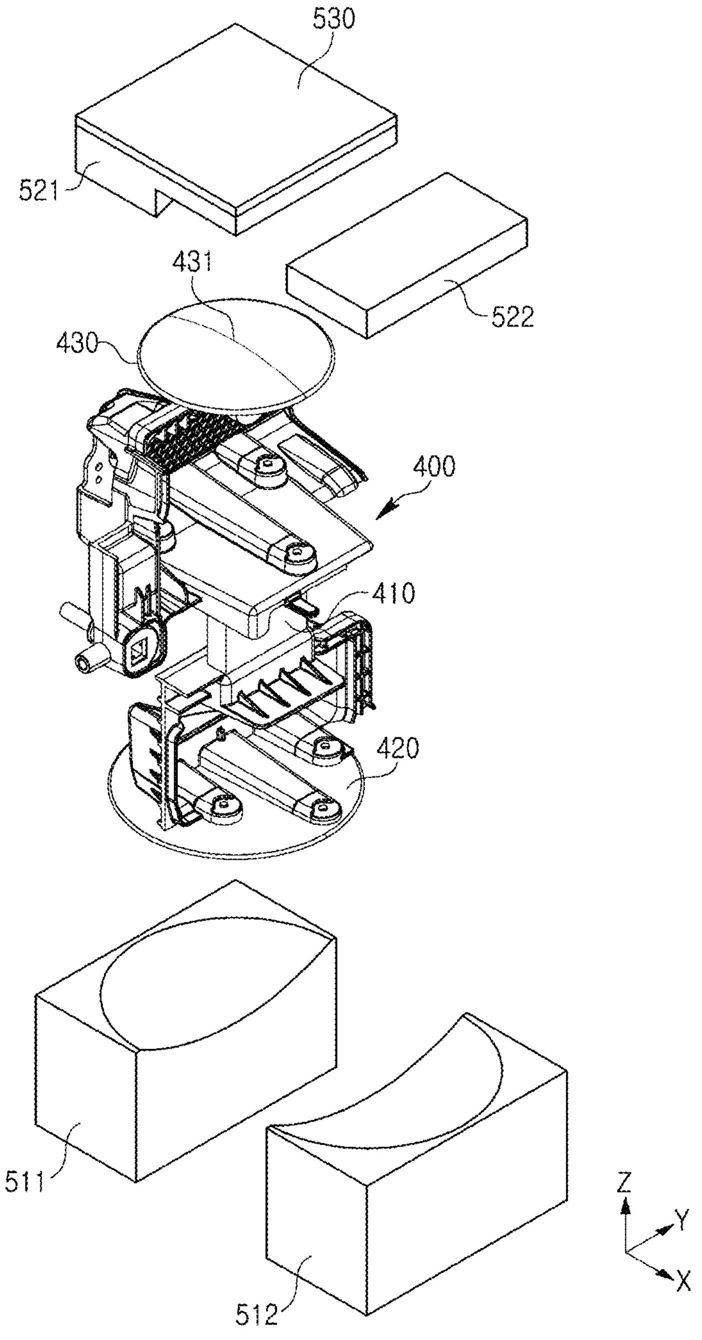
FIG. 6 is an exploded perspective view of an aiming device of a lamp for a vehicle according to an embodiment.
Figure 7:
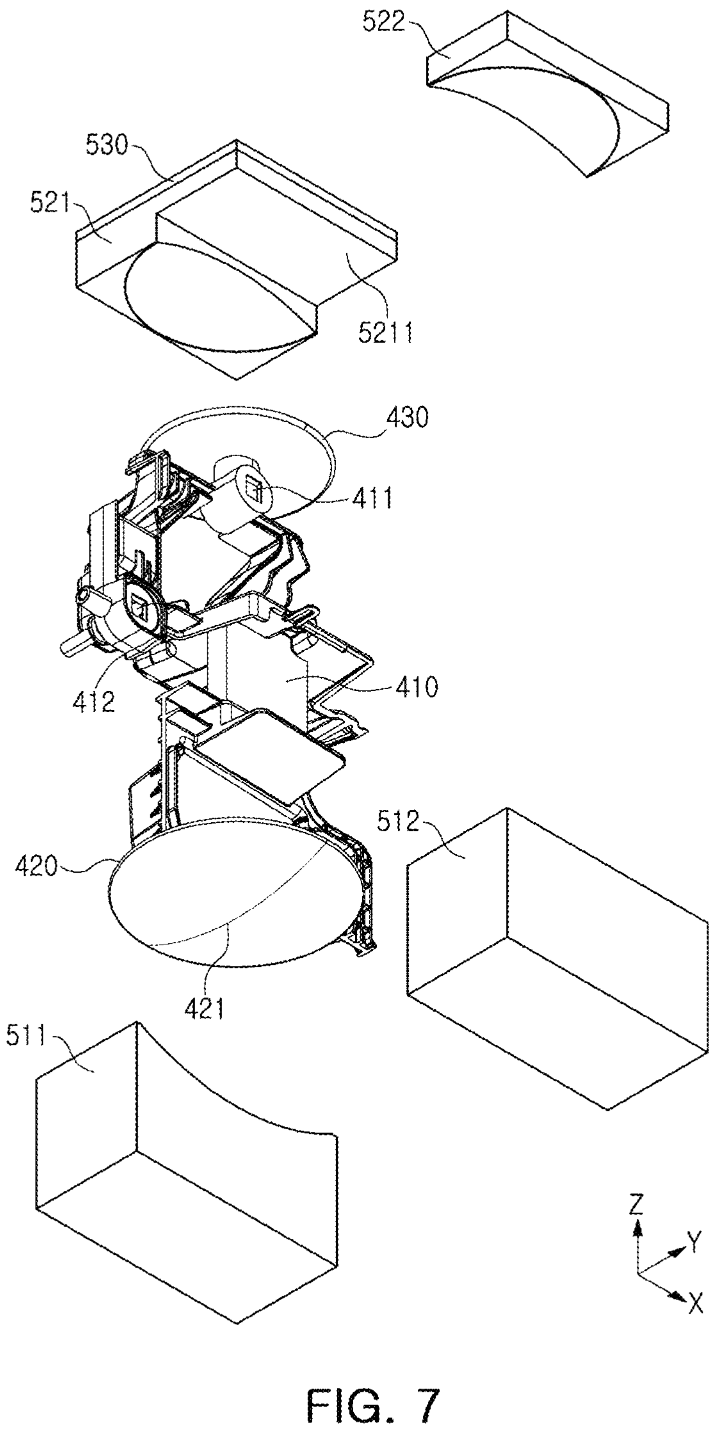
FIG. 7 is an exploded perspective view of an aiming device of a lamp for a vehicle according to an embodiment.
Figure 8:
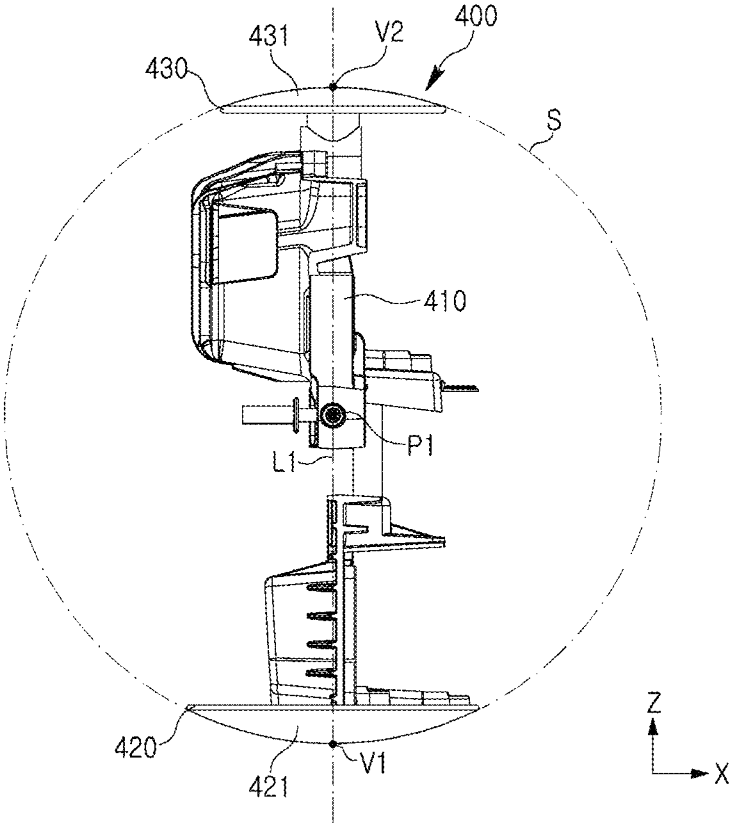
FIG. 8 is a side view of an aiming bracket of an aiming device according to an embodiment.
Figure 9:
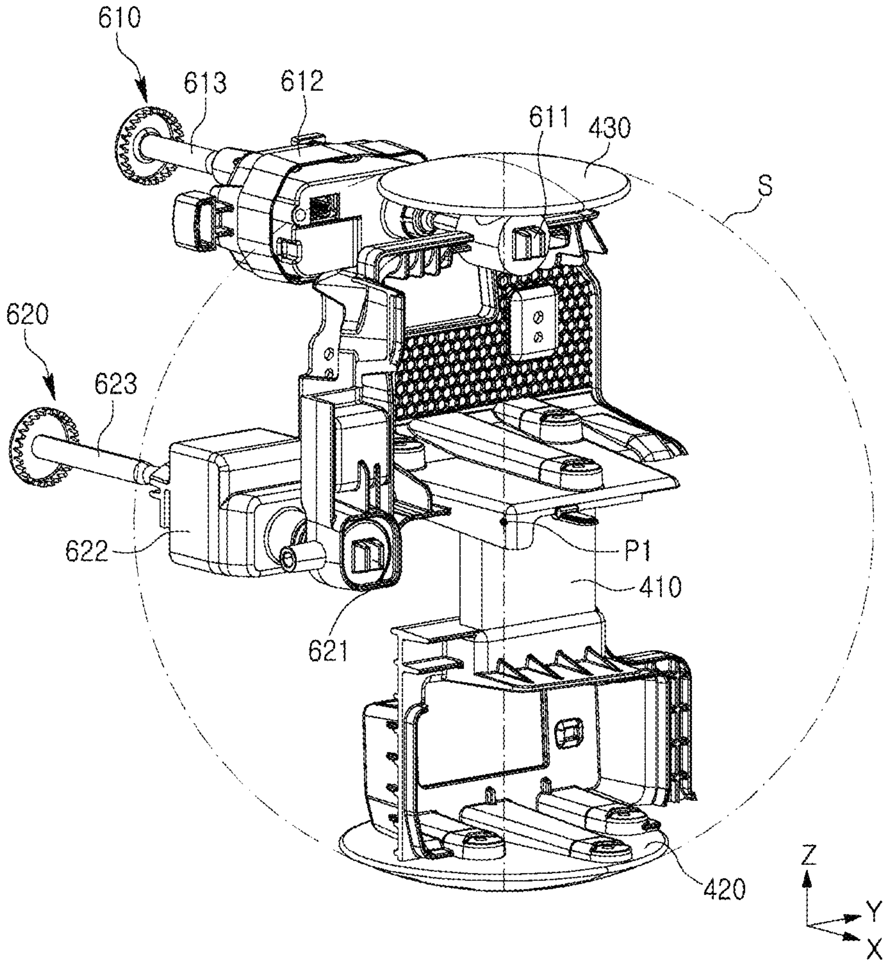
FIG. 9 is a drawing illustrating an aiming bracket and an aiming unit of an aiming device according to an embodiment.

FIG. 5 is a perspective view of an aiming device for a lamp for a vehicle according to an embodiment. FIG. 6 is an exploded perspective view of an aiming device for a lamp for a vehicle according to an embodiment. FIG. 7 is an exploded perspective view of an aiming device for a lamp for a vehicle according to an embodiment. FIG. 8 is a side view of an aiming bracket of an aiming device according to an embodiment. FIG. 9 is a drawing illustrating an aiming bracket and an aiming unit of an aiming device according to an embodiment.

FIG. 5 is a drawing of a lamp for a vehicle 1 illustrated in FIG. 3 with the light source module 200 omitted. FIGS. 6 and 7 are drawings of the aiming device 300 illustrated in FIG. 5, with the aiming unit 600 omitted. FIG. 6 is an exploded perspective view of the aiming bracket 400 and the support structure 500 viewed from above, and FIG. 7 is an exploded perspective view of the aiming bracket 400 and the support structure 500 viewed from below.

FIGS. 5 to 9 are drawings in detail illustrating the structure of the aiming device 300 equipped in the lamp for a vehicle 1 described above with reference to FIGS. 1 to 4, and any redundant description will be omitted below.

Referring to FIGS. 5 to 9, the aiming device 300 according to an embodiment may include an aiming bracket 400, a support structure 500, and an aiming unit 600.

The aiming bracket 400 may be coupled with a light source module 200 and an aiming unit 600, and may rotate up and down and/or left and right based on a pivot point P1 located inside the aiming bracket 400 by the operation of the aiming unit 600.

The aiming bracket 400 may include a base plate 410 to which the light source module 200 and the aiming unit 600 are coupled, and pivot components 420 and 430 extending from the base plate 410.

The base plate 410 may be provided with coupling holes 411 and 412 to which the aiming unit 600 is coupled. For example, a first coupling hole 411 to which a first aiming unit 610 (in detail, a first retainer 611) is coupled and a second coupling hole 412 to which a second aiming unit 620 (in detail, a second retainer 621) is coupled may be formed in the base plate 410.

Meanwhile, although not indicated by the drawing symbol, the base plate 410 may have a lamp coupling portion for coupling and supporting the light source module 200.

The pivot components 420 and 430 are portions of the aiming bracket 400 that is rotatably supported by the support structure 500, and contact surfaces 421 and 431 that come into contact with the support structure 500 may be formed into a spherical shape.

The pivot components 420 and 430 may be referred to as a rotating sphere having a shape corresponding to a portion of a sphere (S) whose center is located inside the base plate 410 (for example, the center point overlaps the base plate 410) and rotating within a predetermined range relative to the support structure 500 based on the center, and in this case, the center of the sphere (S) may correspond to the pivot point P1.

The pivot components 420 and 430 may include a first pivot component 420 provided on the lower side of the base plate 410 and a second pivot component 430 provided on the upper side of the base plate 410. The first pivot component 420 may have a first contact surface 421 of a spherical shape that rotatably contacts the first support member 510, and the second pivot component 430 may have a second contact surface 431 of a spherical shape that rotatably contacts the second support member 520.

The first contact surface 421 of the first pivot component 420 and the second contact surface 431 of the second pivot component 430 may be formed as spherical surfaces having the same curvature. For example, as illustrated in FIG. 8, each of the first contact surface 421 and the second contact surface 431 may correspond to a portion of the surface of a virtual sphere (S) centered on the pivot point P1, and the distance between the pivot point P1 and the first contact surface 421 and the distance between the pivot point P1 and the second contact surface 431 may be equal to each other and correspond to a radius of the sphere (S).

According to the illustrated embodiment, the first pivot component 420 and the second pivot component 430 may be formed with different sizes. The first pivot component 420 may be formed with a larger size than the second pivot component 430. For example, the first contact surface 421 of the first pivot component 420 supporting the load may have a larger area than the second contact surface 431 of the second pivot component 430. However, this is illustrative, and the shape of the aiming bracket 400 according to an embodiment is not limited to the illustrated embodiment, and the first pivot component 420 and the second pivot component 430 may be formed so that the areas of the first contact surface 421 and the second contact surface 431 are the same, or the second contact surface 431 has a larger area than the first contact surface 421.

The first pivot component 420 may be provided in the lower side in a vertical direction (for example, in the −Z-axis direction) from the pivot point P1 of the aiming bracket 400 so that the load of the aiming device 300 (or the lamp for a vehicle 1) may be supported from below by the first support member 510. For example, the first pivot component 420 may be formed so that the first vertex V1, which is a most convex point on the first contact surface 421, is aligned with the pivot point P1 in a vertical direction (for example, in the Z-axis direction).

The second pivot component 430 may be provided in the upper side in a vertical direction (for example, in the +Z-axis direction) from the pivot point P1 of the aiming bracket 400, to correspond to the first pivot component 420. For example, the second pivot component 430 may be formed so that the second vertex V2 of the second contact surface 431 is aligned with the pivot point P1 and the first vertex V1 in a vertical direction (for example, in the Z-axis direction).

As illustrated in FIG. 8 and FIG. 9, the first pivot component 420 and the second pivot component 430 may be provided at the bottom and top of the base plate 410, respectively, so that the first vertex V1 of the first contact surface 421, the pivot point P1, and the second vertex V2 of the second contact surface 431 are connected by a virtual first straight line L1 extending in a vertical direction, and the distance between the first vertex V1 and the second vertex V2 corresponds to the diameter of the sphere (S).

It may be understood that the aiming bracket 400 according to the illustrated embodiment is formed in a shape in which the first pivot component 420 and the second pivot component 430 are vertically opposed to each other based on the base plate 410 (in detail, the pivot point P1 in consideration of load support and stable aiming operation. However, this is an example, and the shape and position of the first pivot component 420 and the second pivot component 430 in the aiming bracket 400 are not limited to the form illustrated.

According to various embodiments, the first pivot component 420 and the second pivot component 430 may be provided at various positions within a range in which the support structure 500 is supported thereby and the aiming bracket 400 may be rotated based on the pivot point P1. For example, the first pivot component 420 may be the same as the illustrated embodiment, but the second pivot component 430 may be provided on the side of the base plate 410. In this case, the first vertex V1, the pivot point P1, and the second vertex V2 are not located on the same straight line L1, and a predetermined angle is formed between the straight line connecting the second vertex V2 and the pivot point P1 and the straight line connecting the first vertex V1 and the pivot point P1.

The support structure 500 may rotatably support the aiming bracket 400. The support structures 500 may rotatably support the pivot components 420 and 430 while being in spherical contact with the pivot components 420 and 430 of the aiming bracket 400. For example, the support structures 500 may have support surfaces that contact and support the contact surfaces 421 and 431 of the pivot components 420 and 430, and the support surfaces of the support structures 500 may be formed in a spherical shape corresponding to the contact surfaces 421 and 431. For example, the contact surfaces 421 and 431 of the pivot components 420 and 430 and the support surfaces of the support structures 500 may be spherical surfaces having the same curvature.

The support structure 500 may include a first support member 510 corresponding to the first pivot component 420 and a second support member 520 corresponding to the second pivot component 430. For example, the support surface of the first support member 510 may rotatably support the first contact surface 421 of the first pivot component 420, and the support surface of the second support member 520 may rotatably support the second contact surface 431 of the second pivot component 430.

Each of the first support member 510 and the second support member 520 may be provided in a form in which a plurality of parts (components) are combined. For example, the first support member 510 and the second support member 520 may include first support portions 511 and 521 and second support portions 512 and 522, respectively.

The first support member 510 may be formed by combining the first support portion 511 and the second support portion 512. The support surface of the first support member 510 may be formed by connecting recessed portions provided on the respective first support portion 511 and second support portion 512.

According to the illustrated embodiment, the first support member 510 may have a first support portion 511 and a second support portion 512 that are symmetrical, but is not limited thereto, and the first support portion 511 and the second support portion 512 may be formed asymmetrically within the range of forming a support surface corresponding to the first contact surface 421.

The second support member 520 may be formed by combining the first support portion 521 and the second support portion 522. The support surface of the second support member 520 may be formed by connecting the recessed portions provided in the respective first support portion 521 and second support portion 522.

According to the illustrated embodiment, the second support member 520 may have a first support portion 521 and a second support portion 522 that are formed asymmetrically. For example, the first support portion 521 of the second support member 520 may have a step portion 5211 which is connected stepwise from a portion provided with a recessed portion and to which the second support portion 522 is coupled. The second support member 520 may be provided in a form in which the recessed portions provided in the respective first support portion 521 and second support portion 522 are connected to each other to form a support surface as the second support portion 522 is connected to the step portion 5211 of the first support portion 521.

However, the shape of the second support member 520 is not limited by the illustrated embodiment, and according to various embodiments, like the first support member 510, the second support member 520 may also be formed in a shape in which the first support portion 521 and the second support portion 522 are symmetrical.

The support structure 500 may further include an elastic member 530 connected to at least one of the first support member 510 and the second support member 520. For example, the elastic member 530 may be disposed between the lamp housing 100 and at least one of the first support member 510 and the second support member 520 when the first support member 510 and the second support member 520 are coupled to the lamp housing 100 (for example, see FIGS. 16A to 16C).

According to the illustrated embodiment, the elastic member 530 may be coupled to the upper portion of the second support member 520. For example, the elastic member 530 may be coupled to the upper portion of the first support portion 521 of the second support member 520. The elastic member 530 may be disposed between the inner surface of the lamp housing 100 and the second support member 520 when the second support member 520 is coupled to the lamp housing 100, to absorb a gap that occurs when assembling the aiming bracket 400.

Meanwhile, the support structure 500 illustrated in FIGS. 5 to 9 is illustrative, and the support structure 500 is not limited by the form illustrated in the drawings and the description thereof described above. For example, at least one of the first support member 510 and the second support member 520 may be provided as a single part (integrated type) rather than a form in which the first support portions 511 and 521 and the second support portions 512 and 522 are combined. In addition, for example, the elastic member 530 may be combined to both the first support member 510 and the second support member 520, or may be combined only to the first support member 510. In addition, for example, the support structure 500 may not separately have an elastic member 530, and at least one of the first support member 510 and the second support member 520 may be formed of a material having a predetermined elasticity.

The aiming unit 600 may include a first aiming unit 610 coupled to the aiming bracket 400 and equipped to implement vertical aiming, and a second aiming unit 620 coupled to the aiming bracket 400 and equipped to implement horizontal aiming.

For example, the first aiming unit 610 may rotate the aiming bracket 400 vertically or up and down based on the pivot point P1, and the second aiming unit 620 may rotate the aiming bracket 400 horizontally or left and right based on the pivot point P1. According to various embodiments, the first aiming unit 610 may be referred to as a vertical aiming unit, an up-down aiming unit, or an up-down irradiation angle adjustment unit, and the second aiming unit 620 may be referred to as a horizontal aiming unit, a left-right aiming unit, or a left-right irradiation angle adjustment unit.

The first aiming unit 610 and the second aiming unit 620 may include main bodies 612 and 622 having aiming screws 613 and 623, and retainers 611 and 621 which are coupled to an aiming bracket 400 and into which one ends of the main bodies 612 and 622 are fitted, respectively. For example, the retainers 611 and 621 may be the components connecting the aiming bracket 400 and the main bodies 612 and 622.

The retainers 611 and 621 may be inserted into and connected to connecting holes 411 and 412 provided in the aiming point of the aiming bracket 400. For example, the first retainer 611 of the first aiming unit 610 may be coupled to the first coupling hole 411 formed in the vertical aiming point of the aiming bracket 400, and the second retainer 621 of the second aiming unit 620 may be coupled to the second coupling hole 412 formed in the horizontal aiming point of the aiming bracket 400.

The components and structures of the first aiming unit 610 and the second aiming unit 620 are described in detail below with reference to FIGS. 10 and 11.

Figure 10:
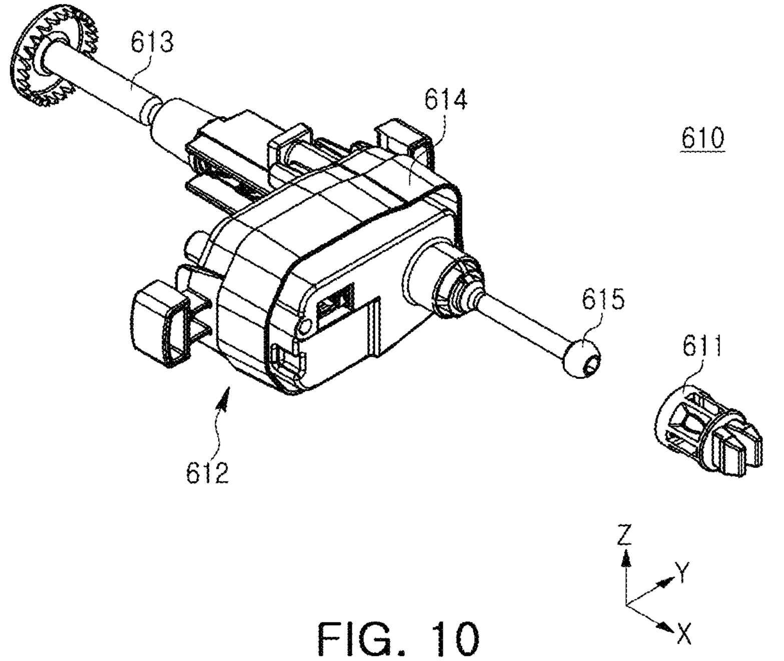
FIG. 10 is a drawing illustrating a first aiming unit of an aiming device according to an embodiment.

FIG. 10 is a drawing illustrating a first aiming unit of an aiming device according to an embodiment. FIG. 11 is a drawing illustrating a second aiming unit of an aiming device according to an embodiment.

Referring to FIG. 10, the first aiming unit 610 of the aiming device 300 according to an embodiment may include a main body 612 and a first retainer 611 coupled with the main body 612. As described above, the first retainer 611 may be fixedly coupled to the aiming bracket 400 (in detail, the first coupling hole 411).

The main body 612 may include the aiming screw 613, and a moving member 614 that is provided with a pivot head 615 connected to the first retainer 611 and that is screw-coupled with the aiming screw 613.

The moving member 614 is screw-connected with the aiming screw 613 and thus may at least partially move linearly based on the rotation of the aiming screw 613. For example, when rotational force is applied to the aiming screw 613, the moving member 614 may move in either a forward (for example, in the +X-axis direction) or a backward (for example, in the −X-axis direction) direction depending on the rotational direction of the aiming screw 613.

The pivot head 615 may be provided at the front of the moving member 614. A receiving groove (not illustrated) into which the pivot head 615 is inserted may be formed in the first retainer 611. The pivot head 615 may be inserted into the receiving groove to be movable or rotatable.

The first aiming unit 610 operates so that the pivot head 615 rotates within the receiving groove of the first retainer 611 when the moving member 614 moves linearly in one of the forward and backward directions by the rotation of the aiming screw 613, and thus, even when the pivot head 615 moves linearly, the aiming bracket 400 to which the first retainer 611 is coupled may be rotated to perform vertical aiming.

Figure 11:
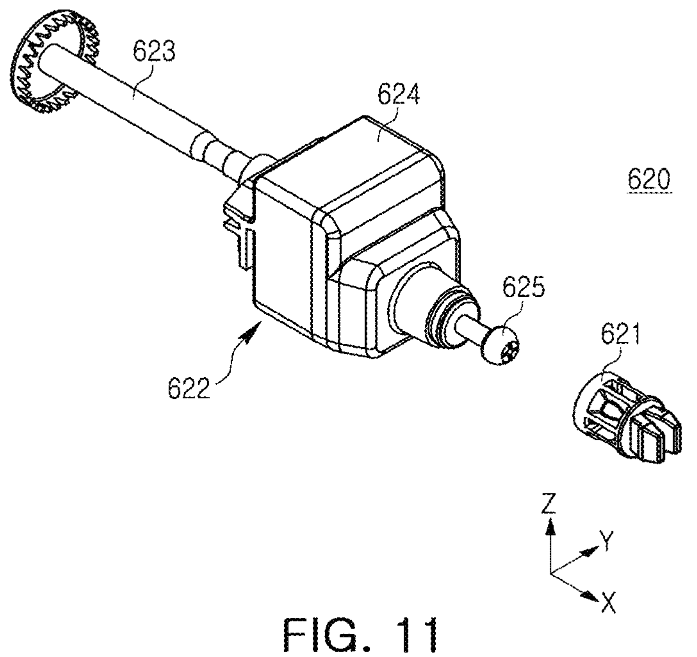
FIG. 11 is a drawing illustrating a second aiming unit of an aiming device according to an embodiment.

Next, referring to FIG. 11, the second aiming unit 620 of the aiming device 300 according to an embodiment may include a main body 622 and a second retainer 621 coupled with the main body 622. As described above, the second retainer 621 may be fixedly coupled to the aiming bracket 400 (in detail, the second coupling hole 412).

Similar to the first aiming unit 610, the body 622 of the second aiming unit 620 may include the aiming screw 623, and a moving member 624 that is provided with a pivot head 625 connected to the second retainer 621 and that is screw-connected to the aiming screw 623.

The main body 622 of the second aiming unit 620 is substantially the same as the main body 612 of the first aiming unit 610 in terms of components or operating mechanisms, so that a detailed description is replaced with the above-described content, and redundant descriptions are omitted.

The second aiming unit 620 operates so that when the moving member 624 moves linearly in either the forward or backward direction by the rotation of the aiming screw 623, the pivot head 625 rotates within the receiving groove of the second retainer 621, and thus, even when the pivot head 625 moves linearly, the aiming bracket 400 coupled with the second retainer 621 may be rotated to perform horizontal aiming.

Meanwhile, although not illustrated, at least one of the moving member 614 of the first aiming unit 610 and the moving member 624 of the second aiming unit 620 may further include a driving unit (for example, a motor and a shaft) for separately moving the pivot head 615, 625 (for example, a rod equipped with a pivot head). For example, the aiming screws 613 and 623 may rotate by the user's manipulation to linearly move the moving members 614 and 624 themselves, and in the case in which the moving members 614 and 624 are equipped with a separate drive unit, the rod equipped with the pivot heads 615 and 625 are connected to the drive unit (for example, screw coupled) and the drive unit may be operated by an external signal to linearly move the pivot heads 615 and 625.

Figure 12:
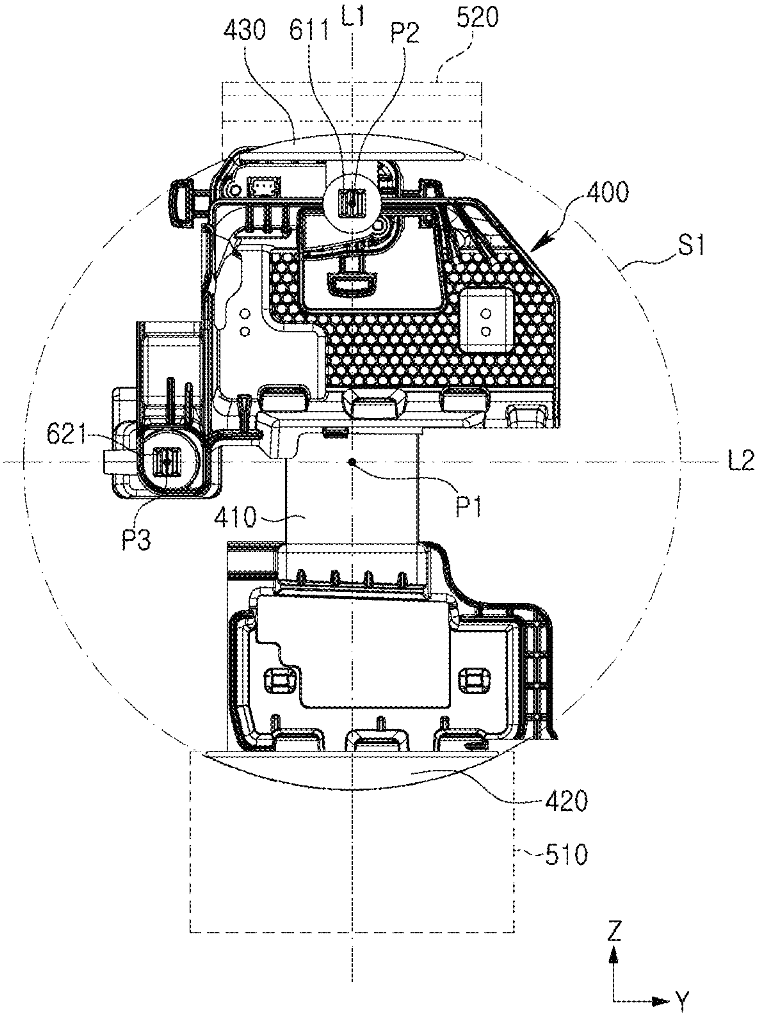
FIG. 12 is a front view of an aiming device according to an embodiment.
Figure 13:
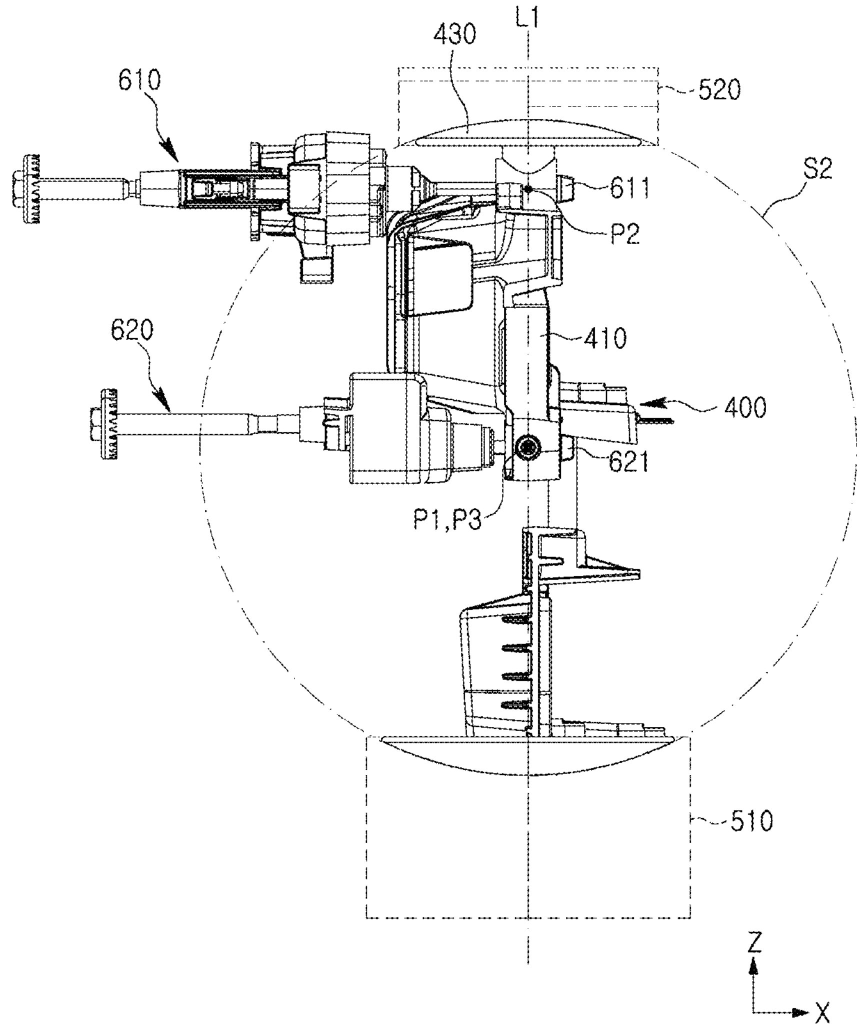
FIG. 13 is a side view of an aiming device according to an embodiment.

FIG. 12 is a front view of an aiming device according to an embodiment. FIG. 13 is a side view of an aiming device according to an embodiment.

FIGS. 12 and 13 are drawings illustrating the positions of a pivot point P1 formed by an aiming bracket 400 and a support structure 500, a vertical aiming point P2 by a first aiming unit 610, and a horizontal aiming point P3 by a second aiming unit 620 in the aiming device 300 described above with reference to FIGS. 5 to 11, and the relationship therebetween. Hereinafter, any duplicate description will be omitted.

FIGS. 12 and 13 illustrate the aiming device 300 in a basic state in which aiming is not performed in the horizontal or vertical direction.

The circular trajectories S1 and S2 of FIGS. 12 and 13 are the boundaries of a virtual sphere (for example, sphere (S) of FIG. 9) formed by the pivot components 420 and 430 and the support structure 500 and defining the rotational path of the aiming bracket 400, and correspond to the boundaries (circumferences) of the sphere (S) when the sphere (S) is viewed from the front and side.

Referring to FIG. 12 and FIG. 13, the aiming device 300 may have a pivot point P1 positioned inside the aiming bracket 400 as the first pivot component 420 and the second pivot component 430 of the aiming bracket 400 are rotatably supported on the first support member 510 and the second support member 520 of the support structure 500, respectively.

For example, the aiming bracket 400 may rotate within a predetermined range based on the pivot point P1 positioned on the base plate 410 of the aiming bracket 400. When the aiming bracket 400 is viewed from the front direction (X-axis direction), the side direction (Y-axis direction), and the plane direction (Z-axis direction), the pivot point P1 may overlap with the base plate 410 of the aiming bracket 400. However, depending on the shape of the aiming bracket 400, the pivot point P1 may be changed to overlap the base plate 410 only in one of the front, side, and planar directions.

The aiming points P2 and P3 are points where an external force is applied by the aiming unit 600 in the aiming bracket 400. The vertical aiming point or the upper and lower aiming point P2 of the aiming bracket 400 may correspond to the position of the first retainer 611 of the first aiming unit 610 coupled to the aiming bracket 400, and the horizontal aiming point or the left and right aiming point P3 of the aiming bracket 400 may correspond to the position of the second retainer 621 of the second aiming unit 620 coupled to the aiming bracket 400.

The vertical aiming point P2 may indicate the position of the pivot head 615 of the first aiming unit 610 coupled to the first retainer 611, and the horizontal aiming point P3 may indicate the position of the pivot head 625 of the second aiming unit 620 coupled to the second retainer 621. For example, the vertical aiming point P2 may be positioned on the pivot head 615 of the first aiming unit 610, and the horizontal aiming point P3 may be positioned on the pivot head 625 of the second aiming unit 620. Accordingly, when aiming is performed based on the basic state in which aiming is not performed in the horizontal and vertical directions, the positions of the aiming points P2, P3 are changed, and based on this, the aiming bracket 400 rotates based on the pivot point P1 to perform aiming.

An aiming device 300 according to an embodiment may be configured such that a pivot point P1 is positioned at the center of an aiming bracket 400, a vertical aiming point P2 is positioned vertically apart from the pivot point P1, and a horizontal aiming point P3 is positioned horizontally apart from the pivot point P1.

The vertical aiming point P2 and the pivot point P1 may be located on the first straight line L1, and the horizontal aiming point P3 and the pivot point P1 may be located on the second straight line L2 perpendicular to the first straight line L1.

In the basic state where aiming is not performed, the first straight line L1 may be parallel to the vertical direction (or up-down direction), and the second straight line L2 may be parallel to the horizontal direction (or left-right direction). For example, when the aiming device 300 in the basic state is viewed from the side, the horizontal aiming point P3 and the pivot point P1 may be indicated as the same point, and when the aiming device 300 in the basic state is viewed from the planar direction, the vertical aiming point P2 and the pivot point P1 may be indicated as the same point.

When vertical aiming is performed, the first straight line L1 connecting the vertical aiming point P2 and the pivot point P1 rotates with the second straight line L2 as the rotation axis, and when horizontal aiming is performed, the second straight line L2 connecting the horizontal aiming point P3 and the pivot point P1 rotates with the first straight line L1 as the rotation axis. Even when aiming is performed, the first straight line L1 and the second straight line L2 may maintain a vertical state.

In this manner, since the vertical aiming point P2 is aligned vertically with the pivot point P1 and the horizontal aiming point P3 is aligned horizontally with the pivot point P1, the aiming bracket 400 does not rotate horizontally during vertical aiming, and the aiming bracket 400 does not rotate vertically during horizontal aiming, thereby improving the aiming accuracy.

However, the positions of the pivot point P1, the vertical aiming point P2, and the horizontal aiming point P3 and the relationships therebetween are not limited by the illustrated embodiment and the above-described description, and may be variously changed. For example, the first straight line L1 and the second straight line L2 may not be perpendicular, the first straight line L1 may form a predetermined included angle with the vertical direction, or the second straight line L2 may form a predetermined included angle with the horizontal direction, and in these cases, horizontal aiming and vertical aiming are appropriately performed in response to the corresponding structure.

Figure 14:
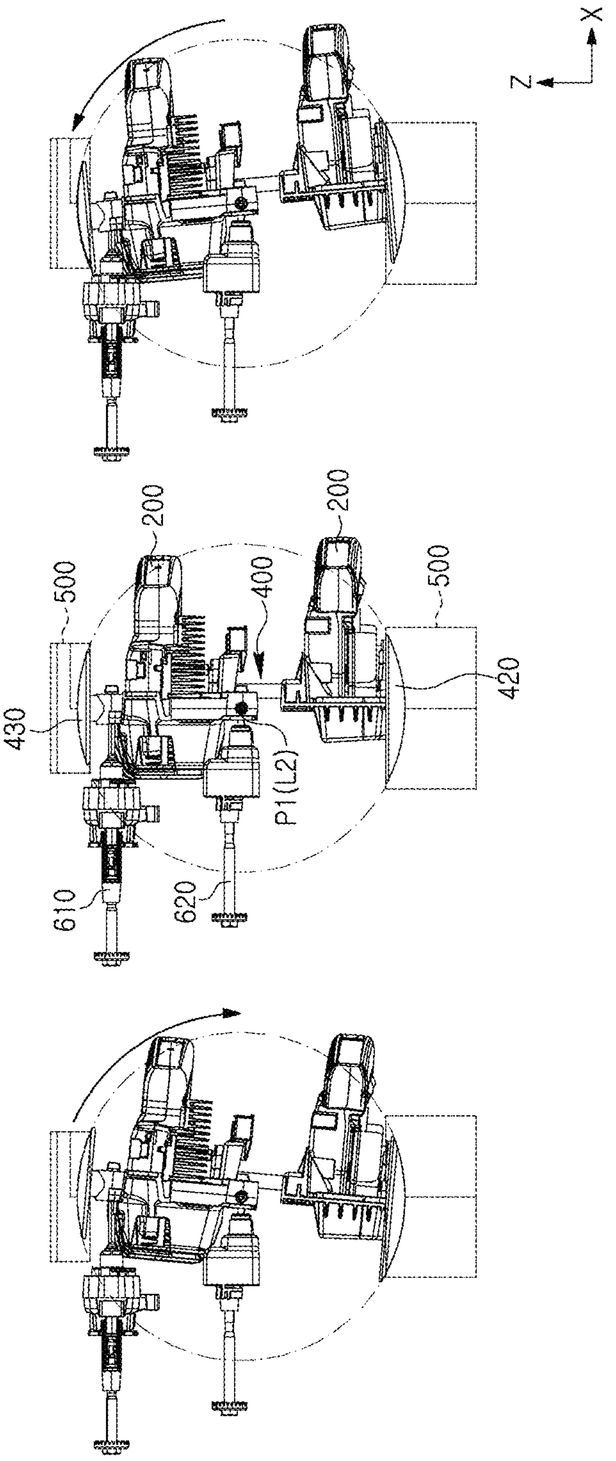
FIG. 14 is a drawing illustrating a vertical aiming operation of a lamp for a vehicle according to an embodiment.
Figure 15:
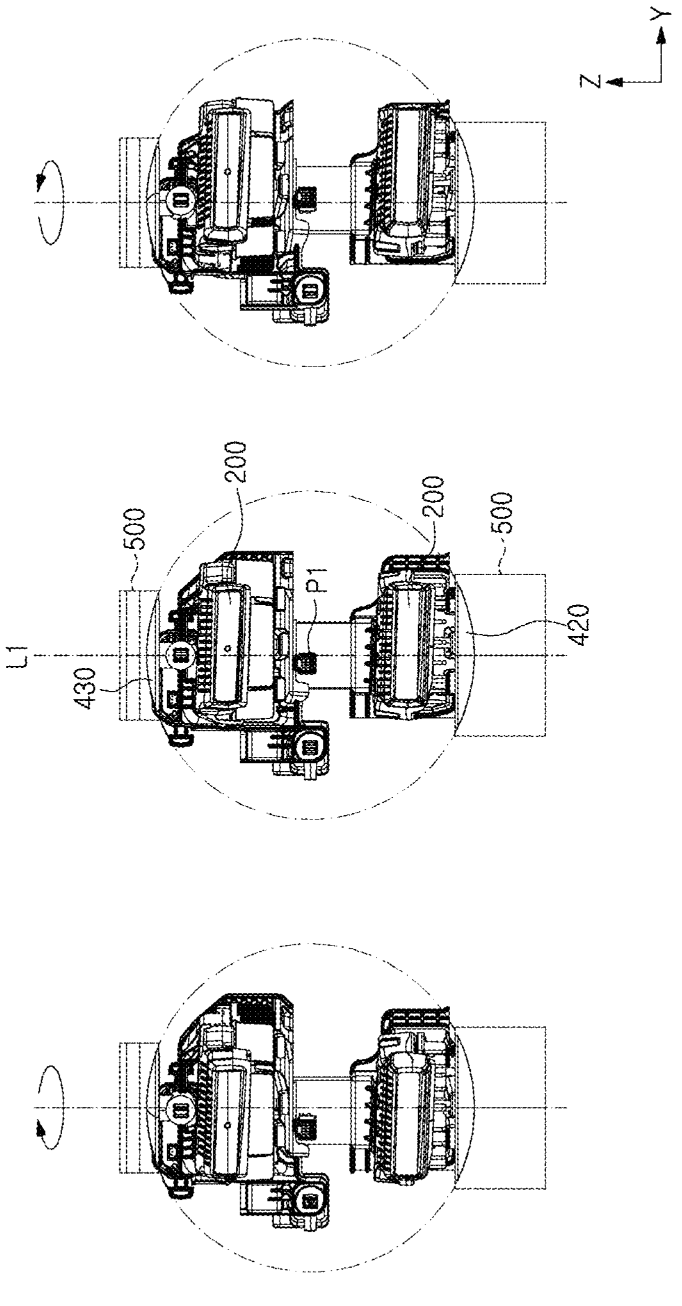
FIG. 15 is a drawing illustrating a horizontal aiming operation of a lamp for a vehicle according to an embodiment.

FIG. 14 is a drawing illustrating a vertical aiming operation of a lamp for a vehicle according to an embodiment. FIG. 15 is a drawing illustrating a horizontal aiming operation of a lamp for a vehicle according to an embodiment.

FIG. 14 and FIG. 15 are drawings in which the lamp housing 100 of the lamp for a vehicle 1 is omitted.

FIG. 14 is a drawing of a lamp for a vehicle 1 viewed from the side to illustrate the vertical or up-down aiming operation of the lamp for a vehicle 1, and FIG. 15 is a drawing of a lamp for a vehicle 1 viewed from the front to illustrate the horizontal or left-right aiming operation of the lamp for a vehicle 1.

Referring to FIG. 14, the lamp for a vehicle 1 may have the light irradiation angle of the light source module 200 adjusted in the up-down direction (or vertical direction) by the operation of the first aiming unit 610. In the middle of FIG. 14, a basic state in which no upper and lower aiming is performed is illustrated, in the left side of FIG. 14, a state in which downward aiming is performed is illustrated, and in the right side of FIG. 14, a state in which upward aiming is performed is illustrated.

When the pivot head 615 of the first aiming unit 610 moves forward (for example, in the +X-axis direction) by the operation of the first aiming unit 610, the pivot head 615 pushes the aiming bracket 400 forward from the vertical aiming point P2 (for example, the point where the first retainer 611 is coupled). The aiming bracket 400 is rotated in the first direction (for example, rotated clockwise with the second straight line L2 as the rotation axis based on FIG. 14) based on the pivot point P1 along the spherical (S) trajectory formed by the pivot components 420 and 430 and the support structure 500 by the external force transmitted from the pivot head 615, and accordingly, the light irradiation direction of the light source module 200 may be adjusted downward (for example, in the −Z-axis direction) by a predetermined angle (for example, transformed from the middle drawing of FIG. 14 to the left drawing).

When the pivot head 615 of the first aiming unit 610 moves backward (for example, in the −X-axis direction) by the operation of the first aiming unit 610, the pivot head 615 pulls the aiming bracket 400 backward from the vertical aiming point P2. The aiming bracket 400 is rotated in the opposite direction of the first direction based on the pivot point P1 along the spherical (S) trajectory formed by the pivot components 420 and 430 and the support structure 500 by an external force transmitted from the pivot head 615, thereby allowing the light irradiation direction of the light source module 200 to be adjusted upward (for example, in the +Z-axis direction) by a predetermined angle (for example, transformed from the middle drawing of FIG. 14 to the right drawing).

When aiming is performed in the vertical direction by the first aiming unit 610, the aiming bracket 400 rotates about the second straight line L2 extending in the horizontal direction while passing the pivot point P1 as the rotation axis.

Referring to FIG. 15, the lamp for a vehicle 1 may have the light irradiation angle of the light source module 200 adjusted in the left-right direction (or horizontal direction) by the operation of the second aiming unit 620. In the middle of FIG. 15, a basic state in which left-right aiming is not performed is illustrated, in the left side of FIG. 15, a state in which right-direction aiming is performed is illustrated, and in the right side of FIG. 15, a state in which left-direction aiming is performed is illustrated.

When the pivot head 615 of the second aiming unit 620 moves forward (for example, in the +X-axis direction) by the operation of the second aiming unit 620, the pivot head 615 pushes the aiming bracket 400 forward from the horizontal aiming point P3 (for example, the point where the second retainer 621 is coupled). The aiming bracket 400 is rotated in the second direction (for example, rotated clockwise with the first straight line L1 as the rotation axis based on FIG. 15) based on the pivot point P1 along the spherical (S) trajectory formed by the pivot components 420 and 430 and the support structure 500 by the external force transmitted from the pivot head 615, and accordingly, the light irradiation direction of the light source module 200 may be adjusted to a predetermined angle in the left direction (for example, +Y-axis direction) (for example, transformed from the middle drawing of FIG. 15 to the right drawing).

When the pivot head 615 of the second aiming unit 620 moves backward (for example, −X-axis direction) by the operation of the second aiming unit 620, the pivot head 615 pulls the aiming bracket 400 backward from the horizontal aiming point P3. The aiming bracket 400 is rotated in the opposite direction of the second direction based on the pivot point P1 along the spherical (S) trajectory formed by the pivot components 420 and 430 and the support structure 500 by the external force transmitted from the pivot head 615, and accordingly, the light irradiation direction of the light source module 200 may be adjusted to a predetermined angle in the right direction (for example, −Y-axis direction) (for example, transformed from the middle drawing of FIG. 15 to the left drawing).

When aiming is performed in the horizontal direction by the second aiming unit 620, the aiming bracket 400 is rotated about the first straight line L1 that extends vertically while passing the pivot point P1 as the rotation axis.

Figure 16A:
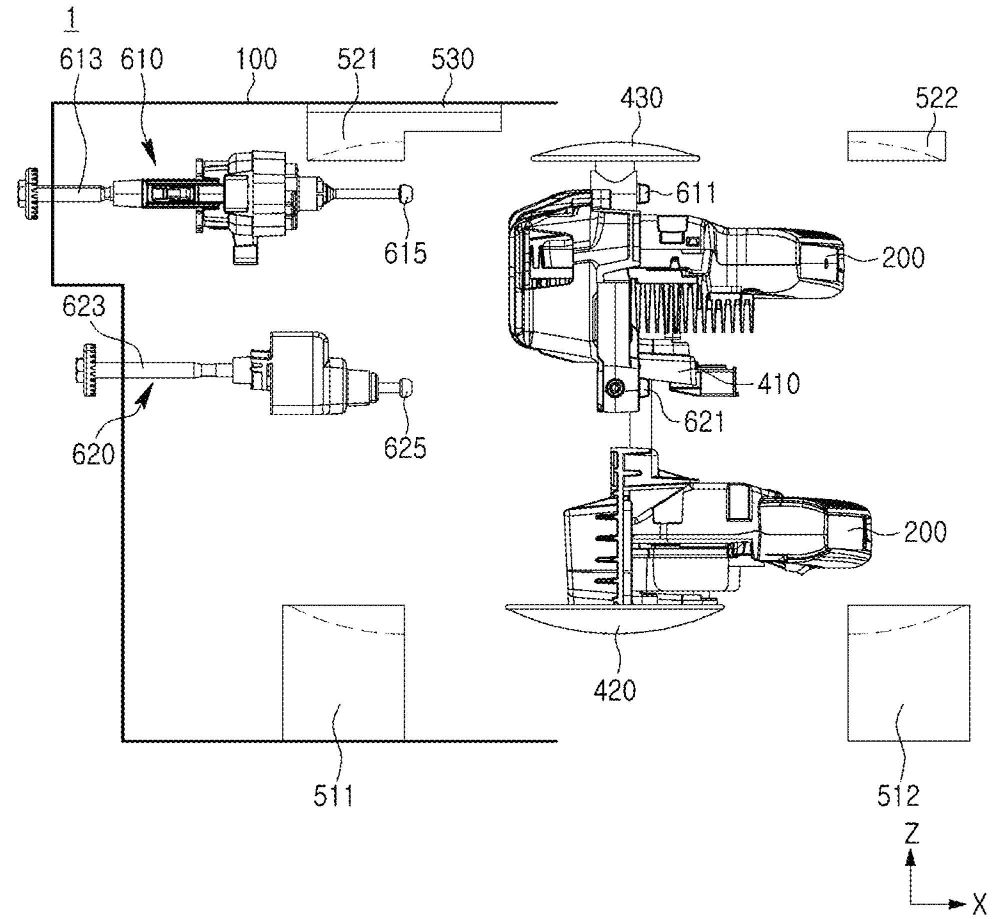
FIG. 16A, FIG. 16B and FIG. 16C are schematic diagrams illustrating a process of assembling a lamp for a vehicle according to an embodiment.
Figure 16B:
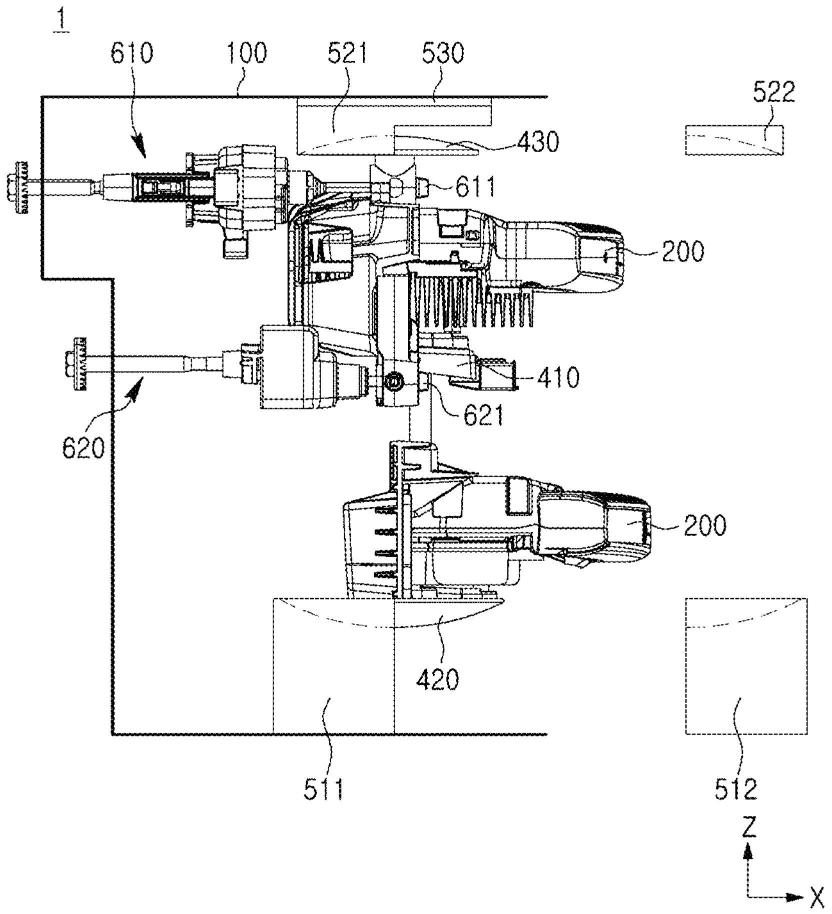
Figure 16C:
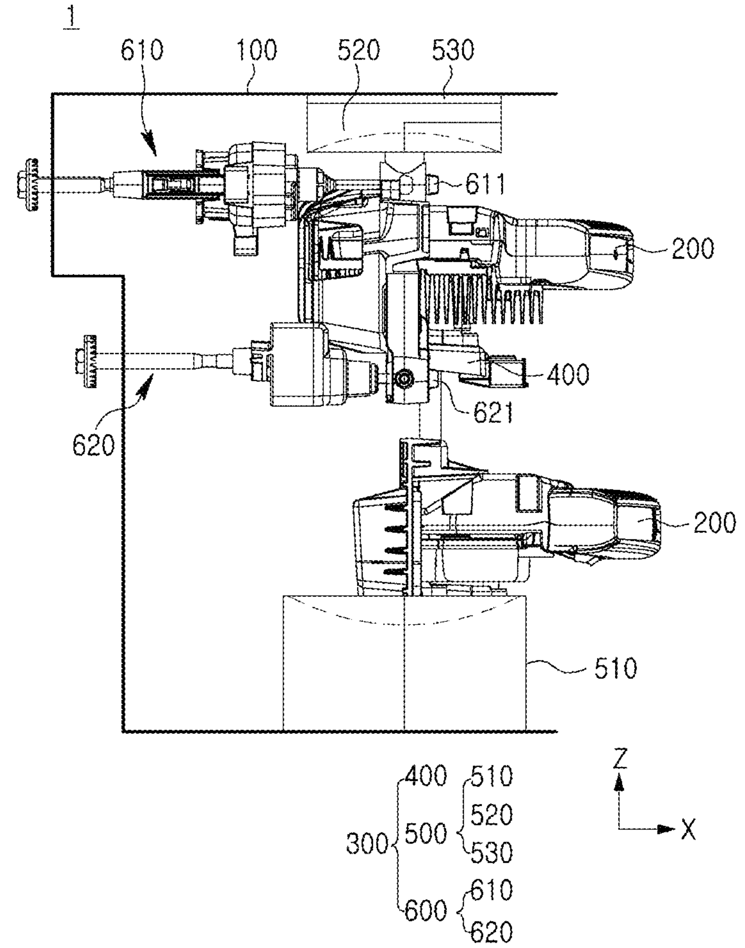

FIGS. 16A, 16B and 16C are schematic diagrams illustrating a process of assembling a lamp for a vehicle according to an embodiment.

FIGS. 16A to 16C are diagrams illustrating an example of a method of assembling a lamp for a vehicle 1 according to an embodiment described with reference to FIGS. 1 to 15 above. When describing FIGS. 16A to 16C, reference will be made to FIGS. 1 to 15 together.

First, as illustrated in FIG. 16A, the main bodies 612 and 622 of the first aiming unit 610 and the second aiming unit 620 are coupled to the lamp housing 100 in a manner in which at least portions of the aiming screws 613 and 623 are positioned outside the lamp housing 100, and the elastic member 530, the first support portion 511 of the first support member 510, and the first support portion 521 of the second support member 520 are coupled to the inner surface of the lamp housing 100. In addition, the first retainer 611, the second retainer 621, and the light source module 200 are coupled to the aiming bracket 400.

Then, as illustrated in FIG. 16B, the pivot head 615 of the first aiming unit 610 is inserted into the first retainer 611, and the pivot head 615 of the second aiming unit 620 is inserted into the second retainer 621, and the aiming bracket 400 in which the first retainer 611, the second retainer 621, and the light source module 200 are assembled is coupled to be pressed between the first support portion 511 of the first support member 510 and the second support portion 522 of the second support member 520.

At this time, the first pivot component 420 of the aiming bracket 400 comes into contact with the first support portion 511 of the first support member 510, and the second pivot component 430 of the aiming bracket 400 comes into contact with the first support portion 521 of the second support member 520, and as the elastic member 530 is compressed, the aiming bracket 400 is stably supported on the respective first support portions 511 and 521.

Thereafter, as illustrated in FIG. 16C, the second support portion 512 of the first support member 510 is coupled with the first support portion 511 of the first support member 510, and the second support portion 522 of the second support member 520 is coupled with the first support portion 521 of the second support member 520, thereby mounting the aiming bracket 400 at the designed position.

Accordingly, the aiming bracket 400 is rotatably supported by the support structure 500 based on the pivot point P1 formed by the pivot components 420 and 430 and the support structure 500, and is rotatable relative to the lamp housing 100 and the support structure 500.

The method of coupling the first support portions 511 and 521 and the second support portions 512 and 522 is not particularly limited, and the coupling thereof may be performed using various coupling means and methods.

Meanwhile, the illustrated assembly method corresponds to an embodiment in which the support structure 500 is separated into two parts for the convenience of assembly, and the lamp for a vehicle 1 according to an embodiment of the present disclosure is not limited to being assembled by the illustrated method, and the assembly method may also be changed depending on deformation of components, or the like.

For example, the first support portions 511 and 521 of the first support member 510 and the second support member 520 and at least a portion of the elastic member 530 may be integrally provided with the lamp housing 100 as a portion of the lamp housing 100.

Also, for example, the second support portions 512 and 522 of the first support member 510 and the second support member 520 may be provided as a portion of a cover or a bezel coupled to the lamp housing, and may be connected to the first support portions 511 and 521 of the first support member 510 and the second support member 520 when the bezel or cover is coupled to the lamp housing 100.

In addition, as described above, either the first support member 510 or the second support member 520 may be formed as a single part rather than a structure in which two parts are combined, and an elastic member 530 may be provided on the first support member 510, or the support structure 500 itself may be formed of an elastic material so that the elastic member 530 may be omitted.

As set forth above, according to an embodiment, an aiming bracket to which a lamp module is coupled may be in spherical contact with a support member, to support a load from below, thereby having a structure resistant to vehicle vibrations.

While example embodiments have been illustrated and described above, it will be apparent to those skilled in the art that modifications and variations could be made without departing from the scope of the present disclosure as defined by the appended claims.

What is claimed is:

1. A lamp for a vehicle, the lamp comprising:

a lamp housing;

an aiming bracket coupled to a light source module and rotatably disposed about a pivot point inside the lamp housing; and a support structure coupled inside the lamp housing and configured to rotatably support the aiming bracket, wherein the aiming bracket includes a pivot component, wherein the pivot component contacts a support surface of the support structure corresponding to a contact surface and forming the pivot point, wherein the pivot component includes a first pivot component having a first contact surface and a second pivot component having a second contact surface, wherein the support structure includes a first support member rotatably supporting the first pivot component and a second support member rotatably supporting the second pivot component, wherein the first support member and the second support member respectively include a first support portion and a second support portion coupled to the first support portion, and wherein the support surface is formed by connecting recessed portions provided on the first support portion and the second support portion, respectively.

2. The lamp of claim 1, wherein the pivot component has a spherical contact surface and includes a portion of a virtual sphere centered on the pivot point, and the contact surface corresponds to the portion of the virtual sphere.

3. The lamp of claim 1, wherein the aiming bracket further includes a base plate to which the light source module is coupled.

4. The lamp of claim 3 wherein the first contact surface and the second contact surface have the same radius of curvature.

5. The lamp of claim 3, wherein the first pivot component is provided on a lower portion of the base plate.

6. The lamp of claim 5, wherein the second pivot component is provided on an upper portion of the base plate to face the first pivot component.

7. The lamp of claim 3, wherein a first vertex of the first contact surface, the pivot point, and a second vertex of the second contact surface are connected by a virtual first straight line.

8. The lamp of claim 7, further comprising:

a first aiming unit connected to a vertical aiming point of the aiming bracket and rotating the aiming bracket in upper and lower directions; and a second aiming unit connected to a horizontal aiming point of the aiming bracket and rotating the aiming bracket in left and right directions.

9. The lamp of claim 8, wherein:

the vertical aiming point is located on the virtual first straight line, the horizontal aiming point and the pivot point are connected by a virtual second straight line, and the virtual second straight line is perpendicular to the virtual first straight line.

10. The lamp of claim 1, wherein the first support member and the second support member are coupled to an inner surface of the lamp housing, and the support structure further includes an elastic member disposed between at least one of the first support member and the second support member and the inner surface of the lamp housing.

11. The lamp of claim 1, wherein at least one of the first support member and the second support member is provided with a shape in which the first support portion and the second support portion are symmetrical.

12. A vehicle comprising the lamp of claim 1.

13. An aiming device for a vehicle, the aiming device comprising:

an aiming bracket to which a light source module is coupled, and configured to rotate about a pivot point;

a support structure configured to rotatably support the aiming bracket; and an aiming unit coupled to the aiming bracket and rotating the aiming bracket about the pivot point, wherein the aiming bracket includes a pivot component having a contact surface, wherein the pivot component contacts a support surface of the support structure corresponding to the contact surface and forming the pivot point, wherein the pivot component includes a first pivot component having a first contact surface and a second pivot component having a second contact surface, wherein the support structure includes a first support member rotatably supporting the first pivot component and a second support member rotatably supporting the second pivot component, wherein the first support member and the second support member respectively include a first support portion and a second support portion coupled to the first support portion, and wherein the support surface is formed by connecting recessed portions provided on the first support portion and the second support portion, respectively.

14. The aiming device of claim 13, wherein the pivot component includes a portion of a virtual sphere centered on the pivot point, and the contact surface having a spherical shape corresponds to the portion of the virtual sphere.

15. The aiming device of claim 13, further comprising:

a first aiming unit connected to a vertical aiming point of the aiming bracket and rotating the aiming bracket in upper and lower directions; and a second aiming unit connected to a horizontal aiming point of the aiming bracket and rotating the aiming bracket in left and right directions.

16. The aiming device of claim 15, wherein a first vertex of the first contact surface, the pivot point, the vertical aiming point, and a second vertex of the second contact surface are connected by a virtual first straight line, and the horizontal aiming point and the pivot point are connected by a virtual second straight line, perpendicular to the virtual first straight line.

* * * * *